Jan. 13, 1942.    M. M. LEWBERS    2,269,538
ELECTRIC WELDING
Filed May 5, 1939
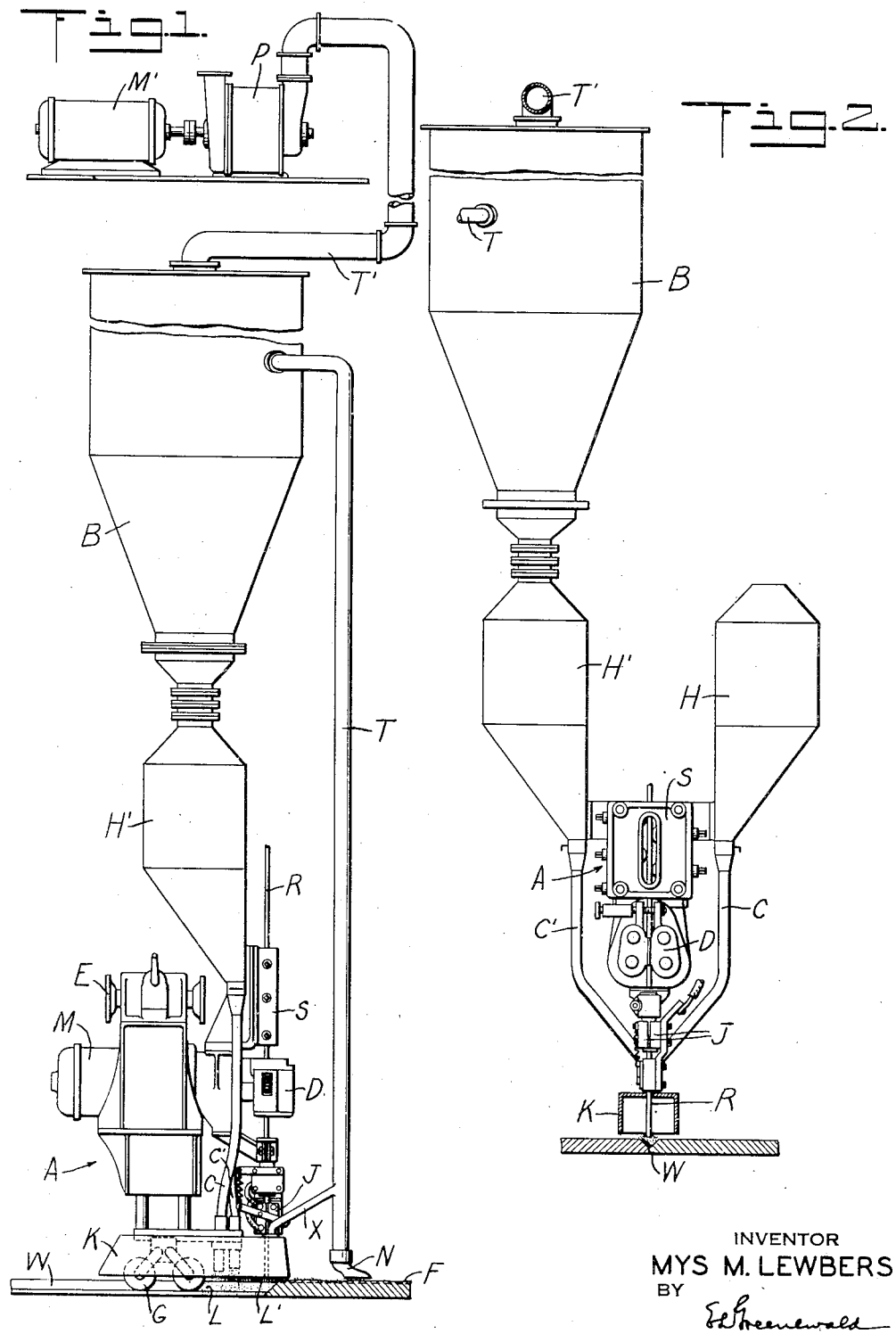
INVENTOR
MYS M. LEWBERS
BY
Ed Greenewald
ATTORNEY Patented Jan. 13, 1942

2,269,538

UNITED STATES PATENT OFFICE 2,269,538

ELECTRIC WELDING

Mys M. Lewbers, Bayside, N. Y., assignor to The Linde Air Products Company, a corporation of Ohio Application May 5, 1939, Serial No. 271,842

9 Claims. (Cl. 219—8)

This invention relates to electric welding and more particularly to an improved electric welding process and apparatus. This application is in part a continuation of my copending application Serial No. 124,361, filed February 6, 1937 (now Patent No. 2,189,399, dated Feb. 6, 1940).

In Patent No. 2,043,960, issued to Lloyd T. Jones, Harry E. Kennedy, and Maynard A. Rotermund jointly on June 9, 1936, there is described and claimed a method of electric welding wherein an unbonded high resistance welding composition in powdered or granular form is deposited or placed along the welding line between opposing edges of objects or work to be welded, and the welding circuit is completed from a bare metal electrode or welding wire to the work through the welding composition in which the fusing end of the electrode is submerged. During a welding operation, as the electrode is fed toward the work and simultaneously moved along the welding line through the granular welding composition, the latter is locally fused at successive portions of the line and forms a high resistance conductive melt which supplies heat to fuse the end of the electrode and edges of the work so that the molten metal from the electrode is deposited under the melt along the welding line and coalesces with the fused edges of the work to provide a sound weld of uniform quality.

The granular welding composition or material is deposited in or along the welding line in such quantities that the welding operation is substantially covered by a blanket of the material. As the welding operation progresses, the fused welding material or melt floats on top of the molten metal from the electrode and forms a protective covering layer therefor. As it is necessary to use liberal quantities of the welding material in order to completely blanket the welding operation, all of the material is generally not fused. The fused portion of the material floats to the top of the deposited molten weld metal and forms, when it cools, a relatively brittle and frangible strip which breaks into pieces due to the contraction therein when cooling. The uppermost portion of the deposited material generally remains in an unfused granular condition. As the welding material used in the process of Patent No. 2,043,960 is valuable, it is desirable to reclaim the unfused material and re-use the same in the welding operation, either alone or mixed with new welding material.

Some of the welding materials usable in the method of Patent No. 2,043,960 may contain constituents which, when heated to the relatively high temperature necessary during the welding operation, will decompose and evolve fumes which it is desirable to remove from the vicinity of the welding operation as and when they are evolved, particularly when the welding operation is performed in a confined space.

It is therefore among the objects of the present invention to provide an improved process of and apparatus for depositing granular welding material along a line to be welded, reclaiming the unfused portion of such welding material, and returning this unfused portion to the welding region either alone or mixed with new welding material, or depositing it separately either beneath or above a layer of new welding material; and also to provide a process of and apparatus for electric welding in which any fumes evolved through decomposition of the welding material may be progressively removed from the welding operation as they are evolved.

These and other objects of the invention will in part be obvious and in part become apparent from the following description and accompanying drawing, in which:

Figs. 1 and 2 are, respectively, a side view and a front view of one form of apparatus adapted to perform the process of this invention.

As the automatic electric welding apparatus illustrated in the drawing is, in most respects, identical to that described and claimed in my above-mentioned copending application, only those parts of the apparatus necessary to a complete understanding of the present invention will be described in detail.

Referring more particularly to the drawing, the automatic welding apparatus A includes an electric motor M operatively associated with suitable welding rod driving or feeding mechanism D by means of which a bare fusible metal rod R may be drawn from a coil, or other source of supply, through a rod-straightening mechanism S and current carrying contact jaws J and fed to the work or welding line W (e. g. a groove between contiguous edges of steel plates) at a rate proportional to the melting rate of the rod. Associated with the welding apparatus A are separate feeding or depositing means, such as hoppers H, H', each adapted to contain a supply of either new or reclaimed granular welding material which may be deposited on the line or work W through conduits C, C' individually communicating with the hoppers H, H', respectively, and having their outlets arranged in tandem along but above the line of welding on the work to be welded. The welding apparatus may be propelled from right to left, as viewed in Fig. 1, with relation to the work, and is guided along the line W by a suitable guiding means G. A recovering or reclaiming means, such as a suction nozzle N, is mounted slightly to the rear of the welding apparatus and is connected by a tube T to a suitable recovering and separating means B. The collecting and separating means is, in turn, connected by a tube or conduit T' to a centrifugal exhauster, or some suitable form of suction creating mechanism P, driven by a motor M'. The discharge outlet of the collecting means B is connected to the hopper H' for a purpose to be described hereinafter.

The entire apparatus described above is designed to move with relation to the welding line, and for this purpose may be mounted either on a fixed or movable overhead support, such as a fixed platform or a movable crane, depending upon whether the work is to be moved beneath the apparatus or the apparatus is to be moved along the work. To permit it to follow irregularities in the welding line, the apparatus A may be supported through the medium of a suitable hinge device E.

In operation, as the apparatus A moves from right to left relatively to the work, new or unused granular welding material is progressively deposited in a layer L along the welding line W from the first hopper H through the first conduit C, which conduit has its outlet in the leading position in the direction of welding. At the same time, a layer L' of reclaimed granular welding material may be deposited from the second hopper H' through the second conduit C' over the layer L to completely blanket the welding operation.

When an appropriate electric current is passed from the end of the rod R, which is inserted in the welding material, to the work, a portion of the lower layer L of welding material is fused and floats to the top of the deposited molten weld metal. This fused layer of material is completely submerged beneath the layer L'. As the fused material cools, it forms a frangible strip F which may be broken away and swept from the completed seam. The nozzle N desirably is located a minimum distance behind the welding region consistent with solidification of the fused welding material.

Meanwhile, as the apparatus A moves relatively to the work, the unused welding material from layer L' and such portion of layer L as is not fused, is recovered by suction through nozzle N. The recovered material, through the suction created by mechanism P, is conveyed upwardly through tube T to separator B, whence the larger particles pass to hopper H' for re-use. The dust and smaller particles of material are retained in the collector and separator, which may be cleaned from time to time.

As mentioned above, it is desirable that the welding operation be completely blanketed beneath the superposed layers or deposits of welding material. Under certain conditions of operation, the reclaimed material may become contaminated with foreign matter, such as iron oxide, grease, etc., from the work. If this reclaimed material were then used as the lower layer L of material deposited along the welding line W, blowholes and occlusions may form in the completed weld as a result of the presence of such foreign matter. When the quality of the weld is of highest importance, it usually is desirable to deposit a layer of new or unused material directly onto the work and use the reclaimed material to cover said layer and blanket the welding operation.

However, if conditions are such that the surface of the work is comparatively clean and the quality of the weld is of less importance than economy in forming the weld, the reclaimed material may be deposited directly in and along the line to be welded, either alone or mixed with new or fresh material. In some cases, it may be desirable to first deposit the reclaimed material directly in or along the welding line and use new material for the blanketing layer L'. With the described apparatus, these various layer combinations may be effected by transporting the conduits C, C' and parts associated therewith. When so transposed, the conduit C', which communicates with the hopper H' adapted to contain a supply of reclaimed welding material, has its outlet in the leading position in the direction of welding.

In the event that any of the constituents of the granular welding material or composition are such as to develop, when highly heated, undesirable fumes, such fumes are readily and completely removed by suction through the nozzle N and its associated suction creating apparatus. To supplement the function of the nozzle N, a hood K may be secured to the lower end of the apparatus A, surrounding the guiding mechanism G, the lower end of conduits C, C' and the lower end of rod R. The lower edge of the hood is disposed closely adjacent the work and a short conduit X, of small diameter, may connect the hood K to the tube T a short distance above the entrance of nozzle N. A suction pressure of less intensity than that at the mouth of nozzle N may thus be maintained above and adjoining the welding region and any fumes will be quickly withdrawn from said region.

While a particular embodiment of the method and apparatus of the invention has been described, it will be obvious to those skilled in the art that modifications may be made, and that certain features may be used independently of others, without departing from the spirit and scope of the invention.

What is claimed is:

1. In a process of electric welding in which high resistance granular fusible welding material is deposited on the work to be welded, the end of a metallic welding rod is inserted into said material, and an electric current of sufficient magnitude to fuse a portion of said material, to melt metal from the end of said welding rod, and to coalesce said melted metal on the adjacent portion of the work, is passed from said welding rod through said material to said work, the steps which comprise maintaining two separate supplies of such welding material, one of such supplies consisting of unused welding material and the other of such supplies consisting of reclaimed welding material; progressively depositing a layer of welding material from one of such supplies onto the work to be welded; progressively depositing a layer of welding material from the other of such supplies upon such first deposited layer; and, during the welding operation, progressively recovering unfused welding material from adjacent successive portions of the completed weld and adding such recovered welding material to such supply of reclaimed welding material.

2. A process of electric welding as claimed in claim 1, in which such first deposited layer consists of unused welding material supplied from said supply of unused welding material.

3. A process of electric welding as claimed in claim 1, in which such first deposited layer consists of reclaimed welding material supplied from said supply of reclaimed welding material.

4. Electric welding apparatus comprising, in combination, mechanism for feeding a metallic electrode toward metal work as the end of said electrode adjacent the work is melted by an electric current flowing through the adjoining portions of said electrode and the work; feeding means for supplying a layer of fresh unbonded granular welding material to the region around said adjoining portions to shield them and to cover the molten metal produced; means for reclaiming any excess welding material so supplied by said feeding means; and means for depositing a layer of such reclaimed excess material to completely cover said layer of fresh material.

5. Electric welding apparatus comprising, in combination, means for depositing a layer of fresh granular welding material on the work to be welded; a welding rod operatively associated with said layer of material and said work; means for reclaiming unfused welding material from said work; and means for depositing a layer of such reclaimed material to blanket said layer of fresh material.

6. Electric welding apparatus comprising, in combination, mechanism for feeding a metallic electrode toward metal work as the end of said electrode adjacent the work is melted by an electric current flowing through the adjoining portions of said electrode and the work; feeding means for depositing a layer of reclaimed unbonded granular welding material to the region around said adjoining portions to shield them and to cover the molten metal produced; means for depositing a layer of fresh unbonded granular welding material to completely cover said layer of reclaimed material; and means for recovering any excess welding material from the completed portion of the weld and returning such recovered material to said reclaimed material feeding means.

7. Electric welding apparatus as claimed in claim 4, in which said fresh material feeding means is located on one side of said electrode, said reclaimed material depositing means is located between said fresh material feeding means and said electrode, a hood is mounted on said apparatus surrounding the material feeding means and the end of the electrode adjacent the work and substantially fully enclosing the welding region; said reclaiming means includes a nozzle disposed adjacent the work and on the opposite side of said electrode from said fresh material feeding means and said reclaimed material depositing means and suction creating mechanism for creating a suction pressure in said nozzle; and a connection is provided between the interior of said hood and said suction creating mechanism.

8. Electric welding apparatus comprising, in combination, means for feeding a bare metallic welding rod to the work to be welded; guiding means disposed in advance of said feeding means and engaging the work to be welded; a first hopper secured to said feeding means; a first conduit secured to the lower end of said first hopper, the free end of said conduit being disposed adjacent the work and in alignment with and between said guiding means and said welding rod; a second hopper secured to said feeding means; a second conduit secured to the lower end of said second hopper, the free end of said second conduit being disposed adjacent the work in alignment with said feeding means and said welding rod and behind said first conduit; a nozzle disposed in alignment with and behind said welding rod; suction creating means; collecting means; a conduit connecting said suction creating and collecting means; a conduit connecting said nozzle and collecting means; and discharge means connecting the upper end of one of said hoppers to said collecting means.

9. Electric welding apparatus comprising, in combination, a hopper adapted to contain a supply of unused granular welding material; a hopper adapted to contain a supply of reclaimed granular welding material; two conduits individually communicating with said hoppers and having their outlets arranged in tandem along but above the line of welding on the work to be welded, said conduits being constructed and arranged to separately feed welding material from said hoppers onto the work and to deposit the material fed from one of said hoppers upon the material fed from the other of said hoppers; mechanism for feeding a fusible metal welding rod toward the work and into the superposed deposits of welding material; and means for recovering a portion of such deposited welding material from adjacent a completed part of the weld and for conveying such recovered material to the hopper adapted to contain a supply of reclaimed welding material.

MYS M. LEWBERS.